United States Patent [19]

Beasley

[11] Patent Number: 5,086,851
[45] Date of Patent: Feb. 11, 1992

[54] COMBINATION THRUST AND RADIAL BEARING FOR USE IN DOWN-HOLE DRILLING TOOLS

[75] Inventor: Thomas R. Beasley, Katy, Tex.
[73] Assignee: Dailey Petroleum Service Corp., Houston, Tex.
[21] Appl. No.: 604,784
[22] Filed: Oct. 26, 1990
[51] Int. Cl.[5] .................... E21B 4/02; F16C 19/02; F16C 19/18
[52] U.S. Cl. ..................... 175/101; 384/613
[58] Field of Search .......... 175/101, 320, 371, 372; 384/609, 613, 617, 97, 507

[56] References Cited

U.S. PATENT DOCUMENTS

| | | | |
|---|---|---|---|
| 2,350,364 | 6/1944 | Menhall | 175/101 |
| 4,135,772 | 1/1979 | Stodt | 384/613 |
| 4,260,202 | 4/1981 | Crase et al. | 384/613 X |
| 4,386,666 | 6/1983 | Crase et al. | 175/101 |
| 4,518,049 | 5/1985 | Baldenko et al. | 175/170 |
| 4,618,271 | 10/1986 | Li | 384/613 X |
| 4,729,675 | 3/1988 | Trzeciak et al. | 384/613 |

FOREIGN PATENT DOCUMENTS 800299  8/1958  United Kingdom ............... 175/101

*Primary Examiner*—William P. Neuder
*Attorney, Agent, or Firm*—Arnold, White & Durkee

[57] ABSTRACT

A down-hole motor and bearing arrangement 22 includes a pair of longitudinally spaced apart bearings 26, 28 that each have multiple rows of ball bearings 36 positioned between a unitary inner race 34 and a two piece outer race 56. The race 34 includes a plurality of longitudinally spaced circumferential grooves 71-73 formed therein, while the outer race 56 includes a plurality of corresponding longitudinally spaced circumferential grooves 77-79 formed on an inner surface thereof. A series of openings 65-67 extend through the outer race 56 and intersect with the circumferential grooves 77-79. The openings 65-67 have a diameter slightly larger than the diameter of the ball bearings 36 but less than the longitudinal width of the grooves 77-79. Further, the openings 65-67 are positioned adjacent one longitudinal end of the circumferential grooves 77-79 so that the ball bearings 36 may be loaded therethrough when the inner race 34 is longitudinally positioned to align the circumferential grooves 71-73 with the openings 65-67. However, when the inner race 34 is longitudinally shifted, the ball bearings 36 are captured between the raised portions defining the grooves 71-73; 77-79, thereby preventing the ball bearings 36 from passing through the openings 65-67.

10 Claims, 3 Drawing Sheets

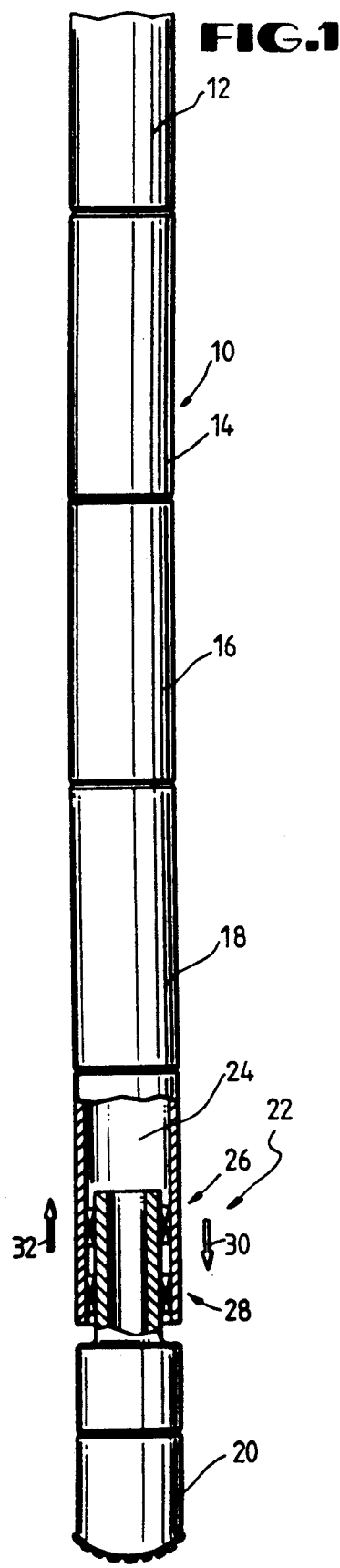
FIG.1
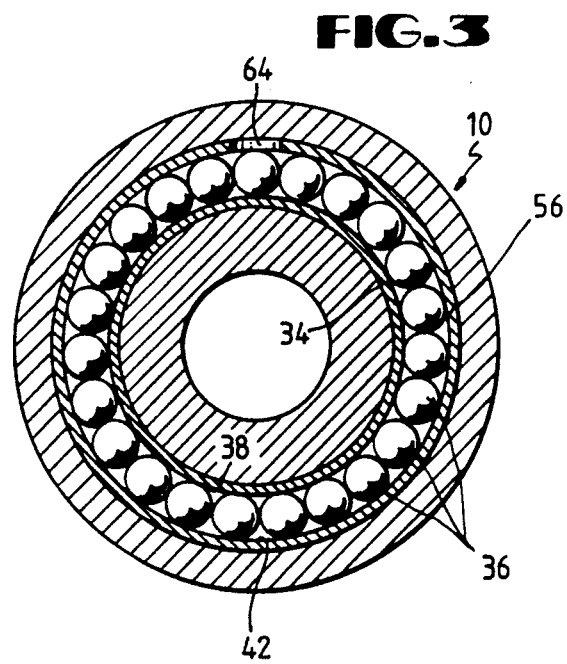
FIG.3
FIG.4
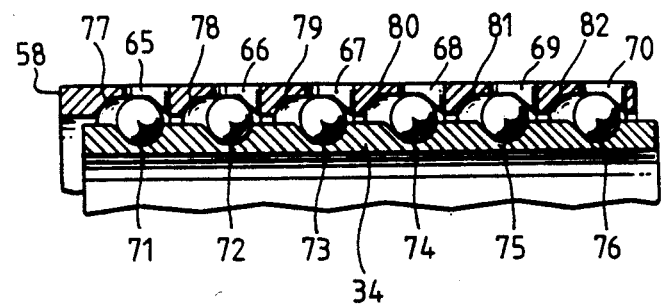
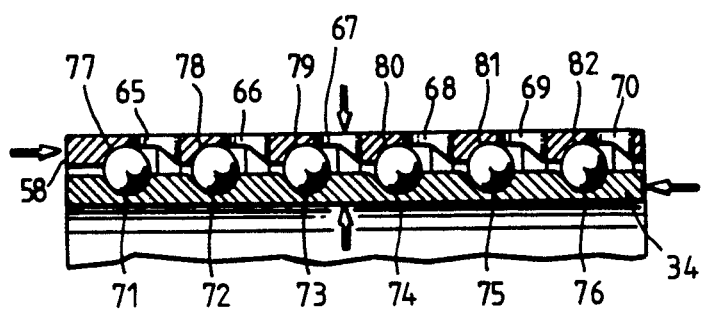
FIG.5

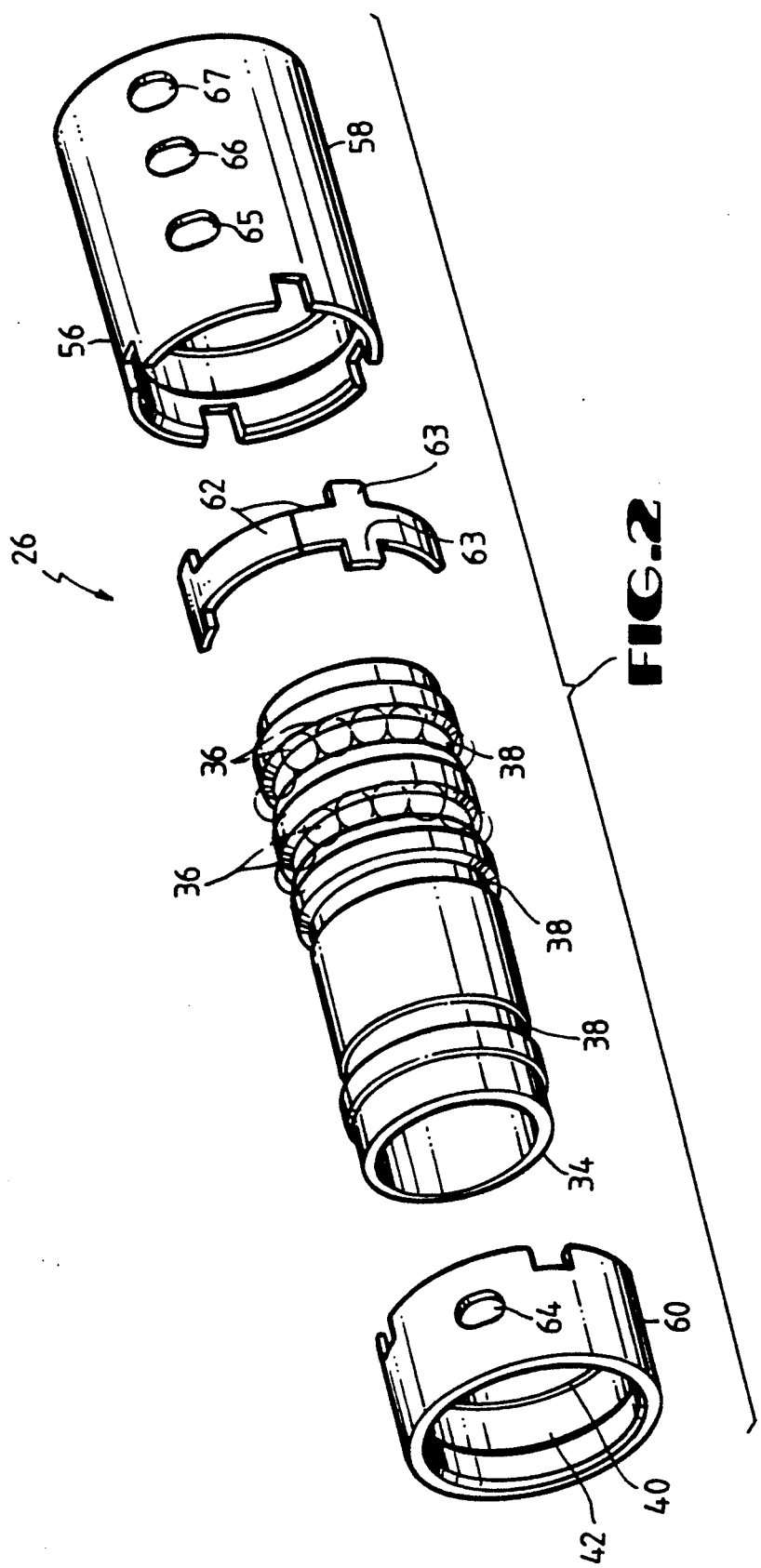

COMBINATION THRUST AND RADIAL BEARING FOR USE IN DOWN-HOLE DRILLING TOOLS

BACKGROUND OF THE INVENTION

1. Technical Field

This invention relates generally to a bearing configuration adapted for withstanding high radial and thrust loads and, in particular, to a multiple level bearing for use in down-hole drilling operations.

2. Description of the Related Art

In the field of oil well drilling, it is often desirable to use down-hole tools that are rotatable relative to the major portion of the drill string. For example, in some wells, such as horizontally drilled wells, it is desirable that a down-hole motor be used to rotate the drill bit, rather than rotating the entire drill string. Similarly, it is often desirable that a down-hole drilling jar mandrel be likewise rotatable relative to the jar housing. Accordingly, it should be readily appreciated that some type of bearing is positioned in the down-hole tool to allow for this desirable rotation relative to the drill string.

Those skilled in the art readily recognize that such a bearing is subjected to tremendous thrust and radial loads. For example, during drilling, it is standard for the weight of a portion of the drill string to rest upon the drill bit. The weight of the drill string must necessarily pass through the bearing and thereby places a thrust load on the bearing that is substantially equivalent to the weight on the drill bit plus the dynamics of the drilling action.

Radial loading of the bearing occurs during drilling operations as the drill bit encounters and cuts away relatively hard formations with its side cutters. Further, radial loading of the bearing is exacerbated during operations such as directional or horizontal drilling. During directional and horizontal drilling operations, side cutters on the drill bit perform a large amount of the cutting when the drill bit is forced to change direction, thereby imposing substantial radial loading of the drill bit and, consequently, the bearing.

Standard practice in the design of bearings has been to alter the physical size of the inner and outer races and the rollers therebetween in accordance with the expected thrust and radial loads. However, in the drilling environment, space is limited by the size of the hole being drilled. Thus, the radial dimensions of the bearing are not readily adjustable.

Therefore, to increase the load carrying capacity of a bearing in a drilling environment, it has been suggested that multiple, stacked bearings be employed to better distribute the force. For example, U.S. Pat. No. 4,518,049 issued May 21, 1985 to Baldenko et al. describes a bearing assembly having two rows of ball bearings longitudinally spaced apart and held in place by a multipiece outer race. The multi-piece outer race is constructed from a plurality of pieces to facilitate construction of the bearing. It should be appreciated that construction of a bearing having multiple rows of ball bearings is a complex and time consuming operation. While the inner race can readily take the form of a unitary body, the outer race is ordinarily of a multi-piece construction so that each row of ball bearings may be sequentially loaded therein and thereby trap the inner and outer races into a longitudinally stable device. Accordingly, construction of the bearing is a relatively time consuming task, involving the construction of numerous smaller parts.

Further, for the multiple rows of ball bearings to share the load equally, very accurate positioning of the inner and outer races is required so that each row of ball bearings engages the inner and outer races simultaneously with substantially equivalent force. Thus, the multiplicity of parts that form the outer race must each be machined with a high degree of precision, thereby making the cost of the overall bearing construction relatively high.

The present invention is directed to overcoming or minimizing one or more of the problems discussed above.

SUMMARY OF THE INVENTION

In one aspect of the present invention, a bearing is provided, which includes a generally cylindrical inner race having a first plurality of longitudinally spaced circumferential raised portions forming a plurality of grooves on an outer surface thereof. Each of the first plurality of grooves has a preselected longitudinal width and is spaced a preselected distance apart. A generally cylindrical outer race is coaxially arranged about the inner race. The outer race has a second plurality of longitudinally spaced raised portions forming a plurality of circumferential grooves therebetween in an inner surface thereof. Each of the second plurality of grooves has a second preselected longitudinal width substantially greater than the first longitudinal width. The second plurality of grooves are spaced a preselected distance apart. The outer race forms a plurality of radial openings therethrough, intersecting a first longitudinal end portion of each of the second plurality of grooves. The radial openings have a diameter less than the width of the second plurality of grooves and at least as great as the width of the first plurality of grooves. A plurality of ball bearings, each have a diameter substantially similar to the width of the first plurality of grooves. The ball bearings are positioned within each of the first and second plurality of grooves, substantially captured between one of the first and second plurality of raised portions and spaced from the radial openings.

BRIEF DESCRIPTION OF THE DRAWINGS

Other objects and advantages of the invention will become apparent upon reading the following detailed description and upon reference to the drawings in which:

FIG. 1 illustrates a stylized view of a drill string with a partial cross-sectional view of a bearing and down-hole motor arrangement;

FIG. 2 illustrates an exploded, perspective view of a multi-level bearing;

FIG. 3 illustrates a cross sectional end view of the multi-level bearing;

FIG. 4 illustrates a cross sectional side view of the multi-level bearing in a partially assembled or "ball loading" configuration;

FIG. 5 illustrates a portion of a cross sectional side view of the multi-level bearing in an assembled configuration;

Figure 6:
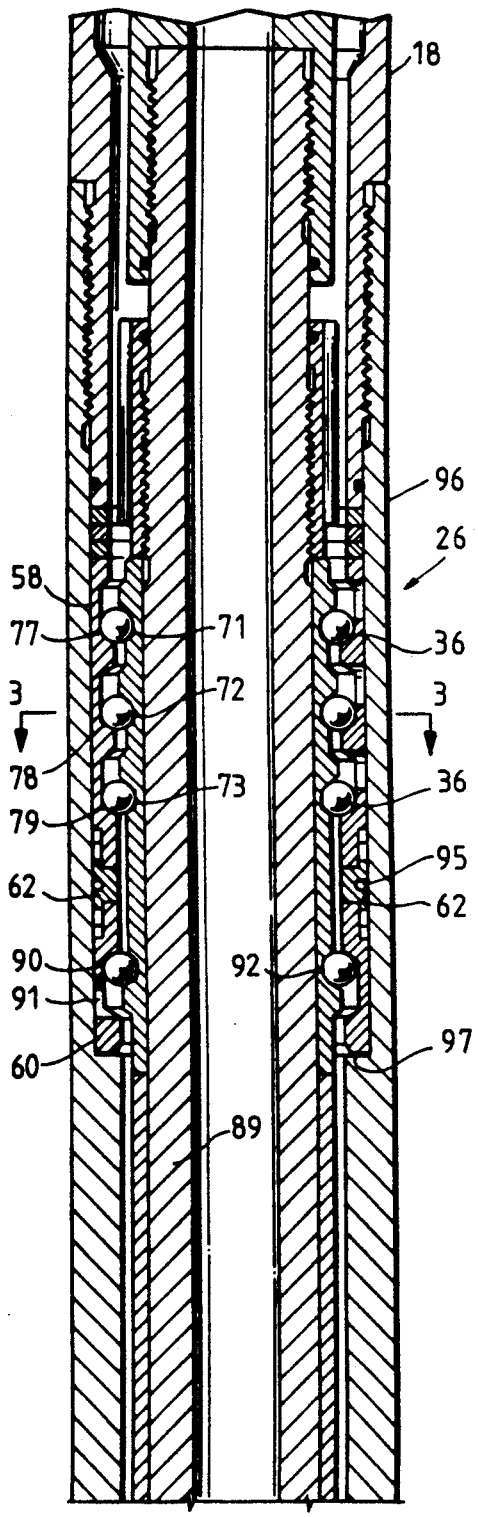
FIG. 6 illustrates a cross sectional side view of a portion of a drill string with an upper bearing contained therein.

While the invention is susceptible to various modifications and alternative forms, specific embodiments thereof have been shown by way of example in the drawings and will herein be described in detail. It should be understood, however, that this specification is not intended to limit the invention to the particular forms disclosed herein, but on the contrary, the intention is to cover all modifications, equivalents, and alternatives falling within the spirit and scope of the invention, as defined by the appended claims.

DESCRIPTION OF A PREFERRED EMBODIMENT

Referring now to the drawings and, in particular, to FIG. 1, a stylized view of a drill string 10 is illustrated. The drill string 10 is composed of a series of tubular members 12, 14, 16, 18 threaded together to form a hollow-core cylinder. A drill bit 20 is rotatably connected at the bottom of the drill string 10 via a bearing and down-hole motor arrangement 22. The bearing and down-hole motor arrangement 22 is schematically shown in a partial cross sectional view.

To effect rotation of the drill bit 20 relative to the drill string 10, a conventional down-hole motor 24 is located within the core of the drill string 10 and is operated by pumping drilling fluid therethrough to impart a rotational movement to the drill bit 20. It should be appreciated that since the drill bit 20 is rotatable relative to the drill string 10, a bearing arrangement is preferably provided to reduce frictional wear therebetween.

In a preferred embodiment of the instant invention, two sets of bearings 26, 28 are provided. The two sets of bearings 26, 28 are longitudinally spaced apart to ensure longitudinal stability of the drill bit 20 as it rotates relative to the drill string 10. In other words, the dual drill bit 20 as it rotates. In an alternative embodiment of the present invention, a single bearing of the type described herein is used in combination with a conventional radial bearing, such as a marine bearing, longitudinally spaced therefrom.

In the preferred embodiment, each of the bearings 26, 28 is configured to accommodate a high thrust load in one of the vertically up and down directions. In other words, the bearing 26 is configured to accommodate a high thrust load in the direction indicated by an arrow 30 and the bearing 28 is configured to accommodate a high thrust load in the direction indicated by an arrow 32. The thrust load identified by the arrow 32 is associated with a large portion of the weight of the drill string 10. When the drill bit 20 is actively engaged with and drilling the subsurface strata, it is typical for the weight of a portion of the drill string 10 to rest on the drill bit 20 and thereby improve the drilling action. Thus, it should be readily appreciated that this force can be extremely high.

The thrust load identified by the arrow 30 typically occurs when the drill string 10 is lifted so that the driling bit 20 no longer engages the subsurface strata and string 10 that extends below the motor 24 passes directly through the bearing 26. Ordinarily, the thrust load represented by the arrow 30 is significantly less than the thrust load represented by the arrow 32. However, during drilling it is common for the drill bit 20 to become stuck in the subsurface strata so that the drill string 20 must be lifted with a substantially greater force, which, of course, passes through the bearing 26. Therefore, in such an embodiment the bearing 26 is constructed of a size and configuration similar to that of the bearing 28.

Referring now to FIG. 2, an exploded, perspective view of the bearing 26 is illustrated. The bearing 26 has an inner race 34 constructed to receive a plurality of ball bearings 36 in a plurality of circumferential grooves 38. The grooves 38 are longitudinally spaced apart a predefined distance so as to interact with a plurality of raised portions 40 positioned about the inner circumference of an outer race 56. The outer race 56 is formed from first and second longitudinal end portions 58, 60 and held in relative positions to each other by a series of four keys 62 positioned therebetween. The significance of the two piece construction and the operation of the keys 62 is discussed in greater detail in conjunction with FIGS. 6 and 7. It is sufficient here to understand that the keys 62 perform the dual function of maintaining the first and second end portions 58, 60 at their properly spaced apart longitudinal positions and preventing undesirable rotation of the first and second end portions 58, 60 relative to one another by virtue of the longitudinal lugs 63.

The raised portions 40 form a series of grooves 42 therebetween for receiving the ball bearings 36 therein. Likewise, the grooves 38 in the inner race 34 form raised portions therebetween. The outer diameter of the inner race 34 at the raised portions thereof is slightly less than the inner diameter of the outer race 56 at its corresponding raised portions. Thus, the inner race 34 can be longitudinally inserted into the outer race 56 to form a generally coaxial unit. The grooves in the inner and outer races 34, 56 are substantially aligned when the inner and outer races 34, 56 are positioned at their proper longitudinal locations. In this proper longitudinal position, a series of openings 64, 65, 66, 67, which extend through the outer race 56 and open into the grooves 42 formed on the inner circumference of the outer race 56, align with the corresponding grooves 38 in the inner race 34. The ball bearings 36 are then loaded through the openings 64-67 in a sufficient quantity so as to fill the aligned grooves 38, 42 in the inner and outer races 34, 56.

The relationship between the ball bearings 36, inner race 34, and the outer race 56 can best be appreciated by reference to FIG. 3, wherein a cross sectional end view of the bearing 26 is illustrated. The inner and outer races 34, 56 are shown to be generally coaxially configured with the annulus formed therebetween filled by the plurality of ball bearings 36. The diameter of the ball bearings 36 is determined by the difference between the outer diameter of the grooves 38 formed in the inner race 34 and the inner diameter of the grooves 42 formed in the outer race 56. Preferably, the ball bearings 36 have a diameter substantially identical to this diametric difference so that radial loading of the bearing 26 is transferred directly from the outer race 56, through the ball bearings 36, and to the inner race 34. Further, the number of ball bearings 36 placed in the annulus is selected to produce a desired intersticial spacing between the ball bearings 36, which, during operation, is filled with a lubricating fluid so as to reduce the build up of frictional heat in the bearing 26.

Referring now to FIGS. 4 and 5, the sequence of placing the ball bearings 36 within the annulus between the inner and outer races 34, 56 is described with reference to the longitudinal cross sectional drawings of the bearing 28. Where convenient similar element numbers are used to identify similar elements within the bearings 26, 28.

FIG. 4 illustrates the inner race 34 and the first end portion 58 of the outer race 56 in a first longitudinal position that corresponds to loading the ball bearings 36 in the annulus therebetween through openings 65-70. FIG. 5, on the other hand, illustrates the inner race 34 and the first end portion 58 of the outer race 56 in a second longitudinal position where the ball bearings 36 are trapped in the annulus and prevented from exiting through openings 65-70.

The inner race 34 includes a series of six longitudinally spaced circumferential grooves 71, 72, 73, 74, 75, 76 formed therein by a plurality of raised portions positioned therebetween. Likewise, the first end portion 58 of the outer race 56 includes six correspondingly spaced circumferential grooves 77, 78, 79, 80, 81, 82 formed therein by a plurality of raised portions positioned therebetween.

Preferably, the longitudinal width of the grooves 71-76 in the inner race 34 is substantially identical to the diameter of the ball bearings 36. On the other hand, the width of the circumferential grooves 77-82 in the outer race 56 are substantially greater than the diameter of the ball bearings 36. When the ball bearings 36 are loaded through the ports 65-70, they fall within the inner race grooves 71-76 and are generally free to move about the circumference of the bearing 28. Once all of the ball bearings 36 have been inserted therein, the inner and outer races 34, 56 are generally free to rotate relative to one another with minimal friction therebetween. However, as long as the inner and outer races 34, 56 remain in the position illustrated in FIG. 4, the ball bearings 36 are also free to pass through the opening 65-70 and fall out of the bearing 28.

The wide grooves 77-82 in the outer race 56 allow relative longitudinal movement between the inner and outer races 34, 56. In particular, FIG. 5 shows the inner race 34 shifted to the left until the ball bearings 36 engage their corresponding raised portion immediately to the right of the ball bearings 36 on the inner race 34 and the raised portion immediately to the left of the ball bearings 36 on the outer race 56. In this position, the ball bearings 36 are restrained against movement through the openings 65-70 and cannot freely fall out of the bearing 28. Therefore, as long as the inner and outer races 34, 56 are maintained in the longitudinal positions illustrated in FIG. 5, the bearing 28 cannot be disassembled by removing the ball bearings 36 through the ports 64-70. It should be appreciated that FIGS. 4 and 5 illustrate only the first portion 58 of the outer race 56.

Figure 7:
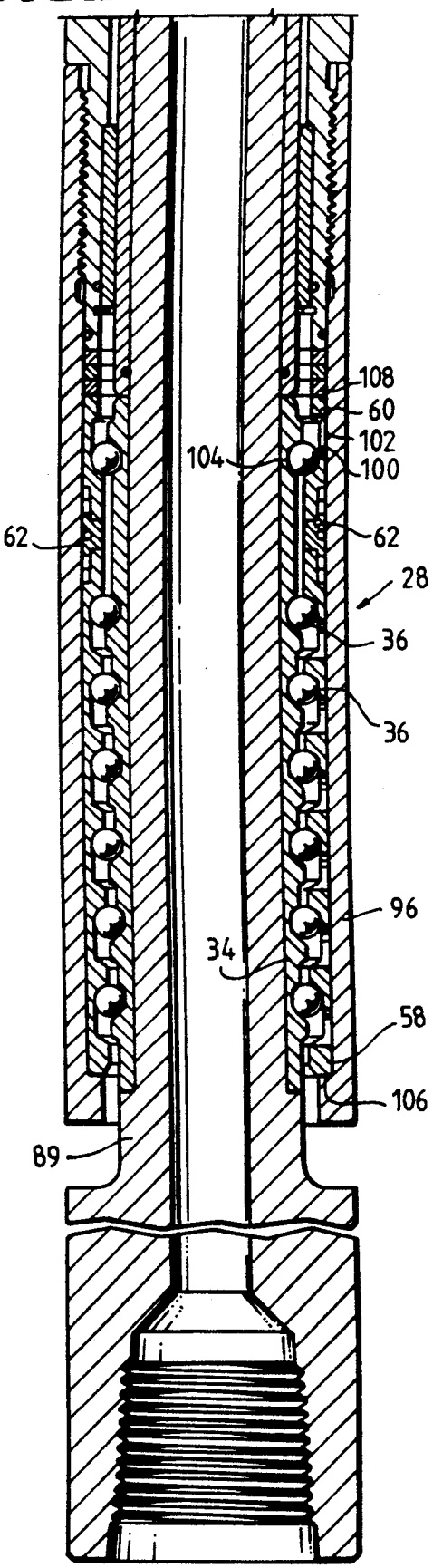
FIG. 7 illustrates a cross sectional side view of a portion of a drill string with a lower bearing contained therein.

FIGS. 6 and 7 illustrate the relationship between the first and second end portions 58, 60 of the outer race 56 and their locations within the drill string 10.

FIG. 6 illustrates a longitudinal cross-section of a portion of the drill string 10 and, in particular, the portion of the drill string 10 corresponding to the bearing 26. Conversely, FIG. 7 illustrates a longitudinal cross-section of a lower portion of the drill string 10 that includes the bearing 28. It should be appreciated that the entire cross-section of the bearings 26, 28 are shown in FIGS. 6 and 7, unlike the partial cross-sectional views illustrated in FIGS. 4 and 5.

As described in conjunction with FIG. 1, the bearing 26 is configured to receive thrust loads caused by the weight of the drill bit 20 suspended from the drill string 10. Accordingly, the bearing 26 differs from the bearing 28 in that it includes substantially fewer rows of ball bearings 36, owing principally to the substantially lower thrust loads experienced on the bearing 26 as opposed to the relatively high thrust loads experienced on the bearing 28. In particular, the bearing 26 includes three rows of ball bearings 36 positioned in three corresponding circumferential grooves 71, 72, 73 in the inner race 34 and three corresponding grooves 77, 78, 79 in the outer race 56. The inner and outer races 34, 56 are shown to be longitudinally shifted so as to capture the ball bearings 36 within the corresponding pairs of circumferential grooves 71, 77; 72, 78; 73, 79 and not allow the ball bearings 36 to pass through openings 65, 66, 67 in the outer race 56.

When the bearing 26 is loaded by, for example, the drill string 10 being raised so that the weight of the drill bit 20, which is attached to the inner race 34 by tubular member 89, is carried by the bearing 26, the upper surface of each of the circumferential grooves 71, 72, 73 rests against the ball bearings 36 and urges the ball bearings 36 into contact with the lower surface of each of the grooves 77, 78, 79.

Alternatively, when the lower bearing 28 is loaded, for example, by allowing the weight of the drill string 10 to rest on the drill bit 20, the upper surface of each of the grooves 77, 78, 79 are spaced a substantial distance from the ball bearings 36 so that the ball bearings 36 are not 72, 73. Rather, as is explained more fully below in conjunction with FIG. 7, this thrust load is accepted by the lower bearing 28. However, to ensure that the longitudinal position of the inner and outer races 34, 56 is not allowed to shift to the position where the openings 65, 66, 67 align with the circumferential grooves 71, 72, 73 the second end portion 60 of the outer race 56 is provided with a longitudinal groove 90 that has an opening 91 passing therethrough in an opposite longitudinal position to the loading ports 65, 66, 67. In other words, the second end portion 60 of the outer race 56 has an opening 91 positioned at the opposite longitudinal side of the circumferential groove 90 to the longitudinal locations of the openings 65, 66, 67 in the circumferential grooves 77, 78, 79.

The inner race 34 has a circumferential groove 92 formed therein that has a width substantially identical to the diameter of the ball bearings 36. Preferably, the ball bearings 36 are loaded into the annulus formed by the grooves 90, 92 by aligning the opening 91 with the circumferential groove 92 and inserting ball bearings therein. Once a sufficient quantity of ball bearings 36 have been loaded into the annulus, the second end portion 60 of the outer race 56 is shifted longitudinally downward, or in the opposite direction to the required longitudinal shifting of the first end portion 58 of the outer race 56. The keys 62 are inserted into the spaced formed between the first and second end portions 58, 60 of the outer race 56 to maintain the first and second end portions 58, 60 in this desired longitudinal position relative to the inner race 34. The entire bearing assembly 26 is temporarily held together by a rubber O-ring 95 positioned in a circumferential groove formed in an outer surface of the keys 62. The O-ring 95 is intended to temporarily hold the bearing assembly 26 in this desired position until the bearing 26 is inserted into the drill string 10. Once the bearing 26 has been inserted into the drill string 10, the outer walls 96 of the drill string 10 hold the bearing assembly 26 together. A shoulder 97 cut into an inner surface of the outer walls 96 retains the bearing 26 against longitudinal movement therein. Likewise, the tubular member 18, positioned immediately above the bearing 26 is threaded into the outer walls 96 and contacts the first end portion 58 of the outer race 56 to further restrict longitudinal movement of the bearing 26. Thus, the bearing 26 is substantially captured against any longitudinal movement within the drill string 10.

It should be appreciated that the ball bearings 36 positioned in the circumferential grooves 90, 92 accept thrust loads caused by the weight of the drill string 10 resting on the drill bit 20. However, only a single row of ball bearings 36 is present in the bearing 26 and would be generally insufficient to accommodate such large thrust loads. Rather, the ball bearings 36 positioned in the circumferential grooves 90, 92 are intended to restrict longitudinal movement of the inner race 34 relative to the outer race 56 in the direction corresponding to thrust loading caused by the drill string 10 resting on the drill bit 20. Further distribution of this load could be accomplished by increasing the number of rows of ball bearings 36 similarly configured to the ball bearings 36 arranged in the circumferential grooves 90, 92. However, in this embodiment, it is preferable that a pair of spaced apart bearings 26, 28 be employed to reduce longitudinal wobbling of the drill bit 20. Therefore, the bearing 28 is arranged in a substantially opposite configuration to that of the drill bit 26 to accommodate the thrust loading caused by the weight of the drill string 10 resting on the drill bit 20, but is spaced a substantial longitudinal distance from the bearing 26. It should be appreciated that the bearing 28 is substantially similar to the bearing 26 and simply installed upside down relative to the bearing 26.

Referring now to FIG. 7, a longitudinal cross-section of the entire bearing 28 is illustrated within the drill string 10. The first end portion 58 of the outer race 56, ball bearings 36, and inner race 34 are substantially identical to that illustrated in FIG. 5. The second end portion 60 of the outer race 56 is shown to have a circumferential groove 100 formed in an inner periphery thereof at a distance spaced from the circumferential grooves of the first end portion 58 of the outer race 56. The longitudinal width of the groove 100 is substantially identical to the longitudinal width of the grooves formed in the first end portion 58 of the outer race 56. However, an opening 102 formed through the second end portion 60 of the outer race 56 is positioned longitudinally opposite to the openings 65-70 in the first end portion 58 of the outer race 56. Thus, it can be readily appreciated that construction of the bearing 28 is substantially similar to construction of the bearing 26.

The circumferential groove 100 has a corresponding circumferential groove 104 formed in an outer surface of the inner race 34. An annulus, formed by the corresponding grooves 100, 104 is filled with ball bearings 36 through the opening 102 when the grooves 100, 102 are aligned by shifting the second end portion 60 of the outer race 56 in a direction toward the first end portion 58 of the outer race 56. This longitudinal shifting of the second end portion 60 of the outer race 56 is accomplished only if the keys 62 have not been placed therebetween. Once the ball bearings 36 are fully loaded into the annulus formed between grooves 100, 104, the second end portion 60 of the outer race 56 is longitudinally shifted in a direction away from the first end portion 58 of the outer race 56 and the space therebetween is filled with the set of four keys 62.

The outer wall 96 of the tubing string 10 has a shoulder 106 formed on an inner surface thereof, which is in contact with the first end portion 58 of the outer race 56. The shoulder 106 prevents longitudinal movement of the bearing 28 in a direction toward the drill bit 20. Likewise, the second end portion 60 of the outer race 56 is captured against longitudinal movement in a direction away from the drill bit 20 by a shoulder 108 formed on an inner surface of the outer wall 96. Thus, the bearing 28 is restricted against longitudinal movement within the drill string 10. The inner race 34 is secured to the tubular member 89, which is attached to the lower portion of the drill string 10 and the drill bit 20. Thus, the drill bit 20 and tubular member 89 are freely rotatable within the drill string 10, but restricted against longitudinal movement therebetween.

It should be appreciated that an alternative embodiment of the bearings 26, 28 takes the form of a single bearing (not shown) formed from the first end portion 58 of the bearing 26 extending above the keys 62 and the first end portion 58 of the bearing 28 extending below the keys 62. Thus, each first end portion 58 of the bearings 26, 28 operates to retain the other first end portion 58 of the outer race 56 in a longitudinally spaced apart position so that the ball bearings 36 are spaced from their corresponding openings 65-70. In this manner, a single bearing having a unitary inner race 34 and a two piece outer race 56 is formed that is capable of accepting large thrust loads in both longitudinal directions.

I claim:

1. A bearing, comprising
   a generally cylindrical inner race having a first plurality of longitudinally spaced circumferential raised portions forming first and second outward-facing grooves on an outer surface thereof;
   a generally cylindrical outer race coaxially arranged about said inner race, said outer race having a second plurality of longitudinally spaced raised portions forming a third and fourth forward-facing circumferential groove therebetween in an inner surface thereof, said third and fourth grooves each having a second preselected longitudinal width substantially greater than said first longitudinal width, said third and fourth plurality of grooves being spaced a preselected distance apart and alignable with said first and second grooves;
   a plurality of ball bearings, each having a diameter substantially similar to the width of said first plurality of grooves, a first portion of said ball bearings being positioned within said first and third grooves, substantially captured between one of said first and second plurality of raised portions and adapted for receiving a longitudinal thrust load in a first direction only, and a second portion of said ball bearings being positioned within said second and fourth grooves, substantially captured between one of said first and second plurality of raised portions and adapted for receiving a longitudinal thrust load in a second, opposite direction only.

2. A bearing, as set forth in claim 1, wherein said third and fourth grooves have a longitudinal width substantially greater than said first and second grooves, said outer race includes first and second longitudinal end portions being longitudinally moveable relative to one another and respectively having said third and fourth grooves formed therein, and said outer race has first and second openings formed therethrough, intersecting said third and fourth grooves respectively at longitudinally opposite ends of said third and fourth grooves, said first and second openings having a diameter greater than the diameter of said ball bearings and less than the diameter of said third and fourth grooves.

3. A bearing system, as set forth in claim 2, wherein said inner and outer races include a plurality of grooves formed in said inner and outer races substantially similar to the second and fourth grooves respectively and a plurality of said ball bearings positioned therebetween.

4. A bearing, comprising a generally cylindrical inner race having a first plurality of longitudinally spaced circumferential raised portions forming a first and second groove on an outer surface thereof, said first and second grooves each having a preselected longitudinal width and being spaced a preselected distance apart;

first and second generally cylindrical outer races coaxially arranged about said inner race and being longitudinally moveable relative to said inner race, said first and second outer races respectively having a second plurality of longitudinally spaced raised portions forming a third and fourth circumferential groove therebetween in an inner surface thereof, said third and fourth grooves each having a second preselected longitudinal width substantially greater than said first longitudinal width, said third and fourth plurality of grooves being spaced a preselected distance apart, said outer race forming first and second radial openings therethrough intersecting opposite longitudinal end portions of said third and fourth grooves, said radial openings having a diameter less than the width of said third and fourth grooves and at least as great as the width of said first and second grooves;

a plurality of ball bearings, each having a diameter substantially similar to the width of said first plurality of grooves, said ball bearings being positioned within said first and third and said second and fourth grooves, substantially captured between one of said first and second plurality of raised portions and spaced from said radial openings.

5. A bearing system, as set forth in claim 4, wherein said inner and outer races include a plurality of grooves formed in said inner and outer races substantially similar to the second and fourth grooves respectively and ball bearings positioned therebetween.

6. A bearing, comprising a generally cylindrical inner race having a first plurality of longitudinally spaced circumferential raised portions forming a plurality of grooves on an outer surface thereof, each of said first plurality of grooves having a preselected longitudinal width and being spaced a preselected distance apart;

a generally cylindrical outer race coaxially arranged about said inner race, said outer race having a second plurality of longitudinally spaced raised portions forming a plurality of circumferential grooves therebetween in an inner surface thereof, each of said second plurality of grooves having a second preselected longitudinal width substantially greater than said first longitudinal width, said second plurality of grooves being spaced a preselected distance apart, said outer race forming a plurality of radial openings therethrough and intersecting a first longitudinal end portion of each of said second plurality of grooves, said radial openings having a diameter less than the width of said second plurality of grooves and at least as great as the width of said first plurality of grooves;

a plurality of ball bearings, each having a diameter substantially similar to the width of said first plurality of grooves, said ball bearings being positioned within each of said first and second plurality of grooves, substantially captured between one of said first and second plurality of raised portions and spaced from said radial openings.

7. A bearing system for use in rotatably connecting a down-hole motor in a drill string to a tool, comprising:

a first bearing connected between said down-hole motor and said tool, and being adapted for receiving a longitudinal thrust load in a first direction only, said first bearing also being adapted for receiving a radial load; and a second bearing longitudinally spaced from said first bearing and connected between said down-hole motor and said tool, said second bearing being adapted for receiving a longitudinal thrust load in a second opposite direction only, said second bearing also being adapted for receiving a radial load.

8. A bearing system, as set forth in claim 7, wherein said second bearing is substantially similar to said first bearing and is positioned between said down-hole motor and said tool in an inverted relationship relative to said first bearing.

9. A bearing system, as set forth in claim 8, wherein said second bearing includes:

a generally cylindrical inner race having a first plurality of longitudinally spaced circumferential raised portions forming a first and second groove on an outer surface thereof, said first and second grooves each having a preselected longitudinal width and being spaced a preselected distance apart;

first and second generally cylindrical outer races coaxially arranged about said inner race and being longitudinally moveable relative to said inner race, said first and second outer races respectively having a second plurality of longitudinally spaced raised portions forming a third and fourth circumferential groove therebetween in an inner surface thereof, said third and fourth grooves each having a second preselected longitudinal width substantially greater than said first longitudinal width, said third and fourth plurality of grooves being spaced a preselected distance apart, said outer race forming first and second radial openings therethrough intersecting opposite longitudinal end portions of said third and fourth grooves, said radial openings having a diameter less than the width of said third and fourth grooves and at least as great as the width of said first and second grooves;

a plurality of ball bearings, each having a diameter substantially similar to the width of said first plurality of grooves, said ball bearings being positioned within said first and third and said second and fourth grooves, substantially captured between one of said first and second plurality of raised portions and spaced from said radial openings.

10. A bearing system, as set forth in claim 9, wherein said inner and outer races include a plurality of grooves formed in said inner and outer races substantially similar to the second and fourth grooves respectively and ball bearings positioned therebetween.

* * * * *

UNITED STATES PATENT AND TRADEMARK OFFICE
CERTIFICATE OF CORRECTION

PATENT NO. : 5,086,851

DATED : February 11, 1992

INVENTOR(S) : Thomas R. Beasley

It is certified that error appears in the above-identified patent and that said Letters Patent is hereby corrected as shown below:

ABSTRACT, line 5, after "The" insert --inner--.

Column 3, line 38, after "dual" insert --bearing arrangement prevents undesirable wobbling of the--.

Column 3, line 62, before "string" insert --the weight of the drill bit 20 and the portion of the drill--.

Column 6, line 28, after "not" insert --urged against the lower surface of each of the grooves 71,--.

Column 8, line 37, delete "forward" and insert --inward--.

Signed and Sealed this

Fifteenth Day of June, 1993

Attest:

MICHAEL K. KIRK

Attesting Officer

Acting Commissioner of Patents and Trademarks